US009589320B2

(12) United States Patent
Koga

(10) Patent No.: US 9,589,320 B2
(45) Date of Patent: Mar. 7, 2017

(54) IMAGE-PICKUP UNIT, IMAGE-PICKUP APPARATUS, AND IMAGE PROCESSING SYSTEM

(71) Applicant: CANON KABUSHIKI KAISHA, Tokyo (JP)

(72) Inventor: Hironobu Koga, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/943,349

(22) Filed: Nov. 17, 2015

(65) Prior Publication Data
US 2016/0148344 A1 May 26, 2016

(30) Foreign Application Priority Data
Nov. 20, 2014 (JP) .................................. 2014-235305

(51) Int. Cl.
*H04N 9/45* (2006.01)
*G06T 3/40* (2006.01)
*H04N 9/04* (2006.01)
*G06T 5/20* (2006.01)
*H04N 5/225* (2006.01)

(52) U.S. Cl.
CPC .............. *G06T 3/4015* (2013.01); *G06T 5/20* (2013.01); *H04N 5/2254* (2013.01); *H04N 9/045* (2013.01); *G06T 2207/10024* (2013.01)

(58) Field of Classification Search
CPC ................. H04N 5/2254; H04N 9/045; H04N 2209/045; H04N 2209/046; G06T 3/4015; G06T 5/20; G06T 2207/10024
See application file for complete search history.

(56) References Cited

U.S. PATENT DOCUMENTS

| 7,755,016 B2* | 7/2010 | Toda ...................... H04N 9/045 250/208.1 |
| 2007/0296965 A1 | 12/2007 | Brady et al. |
| 2010/0140461 A1 | 6/2010 | Sprigle et al. |
| 2014/0307121 A1* | 10/2014 | Hayashi ................ H04N 9/045 348/223.1 |
| 2015/0221691 A1* | 8/2015 | Watanabe .............. H04N 5/332 348/164 |

FOREIGN PATENT DOCUMENTS

JP 2014027414 A 2/2014

OTHER PUBLICATIONS

Bioucas-Dias et al. "A new TwIST: two-step iterative shrinkage/thresholding algorithms for image restoration," IEEE Trans on Image Processing, vol. 16, No. 12, pp. 2992-3004, Dec. 2007.

* cited by examiner

*Primary Examiner* — Tuan Ho
(74) *Attorney, Agent, or Firm* — Rossi, Kimms & McDowell LLP

(57) ABSTRACT

An image-pickup unit includes an image sensor and a color filter. Each filter segment of the color filter corresponds to one of a plurality of pixels of the image sensor, and the plurality of filter segments include first to Z-th ($2^{L-1} \leq Z \leq 2^L$, where L is an integer equal to or larger than four) filter segments having spectral transmittances for transmitted wavelength bands different from each other among light from an object. Each pixel of the image sensor receives light of a plurality of wavelength bands. The plurality of filter segments are irregularly disposed.

14 Claims, 13 Drawing Sheets

FIG. 11A   FIG. 11B   FIG. 11C
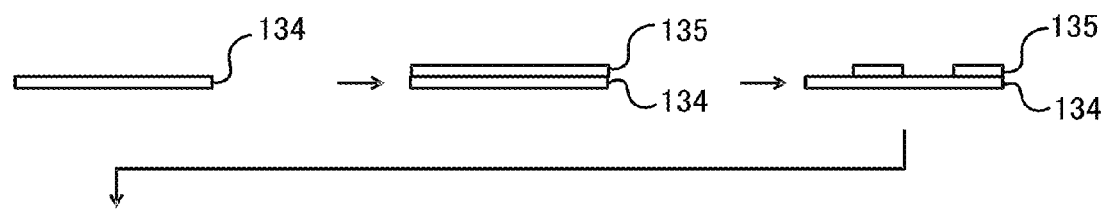
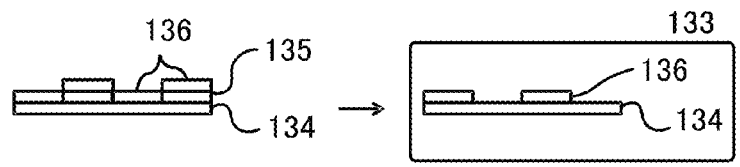
FIG. 11D   FIG. 11E

IMAGE-PICKUP UNIT, IMAGE-PICKUP APPARATUS, AND IMAGE PROCESSING SYSTEM

BACKGROUND OF THE INVENTION

Field of the Invention

The present invention relates to production of a multiband image made of spectral images of four or more different wavelength bands.

Description of the Related Art

A multiband image is effective in identifying the kind of an imaged object and in examining the state of the object, and is exploited in various fields such as remote sensing, biotechnology, medical science, and machine vision. The multiband image is also exploited in the field of computer graphics so as to precisely depict colors of the object. The multiband image has a three-dimensional structure of two spatial dimensions and one wavelength dimension. Different methods for acquiring the multiband image yield different spatial resolutions, wavelength resolutions, and temporal resolutions for the image.

U.S. Patent Application Publication No. 2010/0140461 discloses a method of acquiring a multiband image through an array of color filters that are disposed on an image sensor and have spectral transmittances different from each other. U.S. Patent Application Publication No. 2007/0296965 discloses a method of acquiring a multiband image through combination of image estimation processing and a compression sensing optical system including an encoding mask and a dispersive element. These methods disclosed in U.S. Patent Application Publication No. 2010/0140461 and U.S. Patent Application Publication No. 2007/0296965 can acquire a multiband image with single image capturing and thus yield a high temporal resolution.

J. M. Bioucas-Dias and M. A. T. Figueiredo, "A new TwIST: two-step iterative shrinkage/thresholding algorithms for image restoration", *IEEE Trans. on Image Processing*, vol. 16, Dec. 2007 discloses a fast image estimation processing algorithm such as TwIST (Two-Step Iterative Shrinkage/Thresholding) algorithm.

In the method disclosed in U.S. Patent Application Publication No. 2010/0140461, light incident on a pixel has a single wavelength band. Thus, an increase in the wavelength resolution results in a decreased incident light amount and a decreased image capturing sensitivity. The method disclosed in U.S. Patent Application Publication No. 2007/0296965 requires a multi-imaging optical system and thus an increased size of the system.

SUMMARY OF THE INVENTION

The present invention provides an image-pickup unit, an image-pickup apparatus, and an image processing system that each have a small configuration and can acquire a highly sensitive multiband image through single image capturing.

An image-pickup unit as an aspect of the present invention includes an image sensor including M×N pixels and configured to photoelectrically convert an object image, and a color filter disposed on an object side of the image sensor, and including a plurality of filter segments. Each filter segment corresponds to one of the pixels of the image sensor. The plurality of filter segments include first to Z-th filter segments having spectral transmittances different from each other. The image-pickup unit satisfies predetermined conditions.

Further features and aspects of the present invention will become apparent from the following description of exemplary embodiments with reference to the attached drawings.

BRIEF DESCRIPTION OF THE DRAWINGS

FIGS. 11A to 11E are schematic diagrams of a process of manufacturing the color filter illustrated in FIG. 10.

DESCRIPTION OF THE EMBODIMENTS

Figure 1:
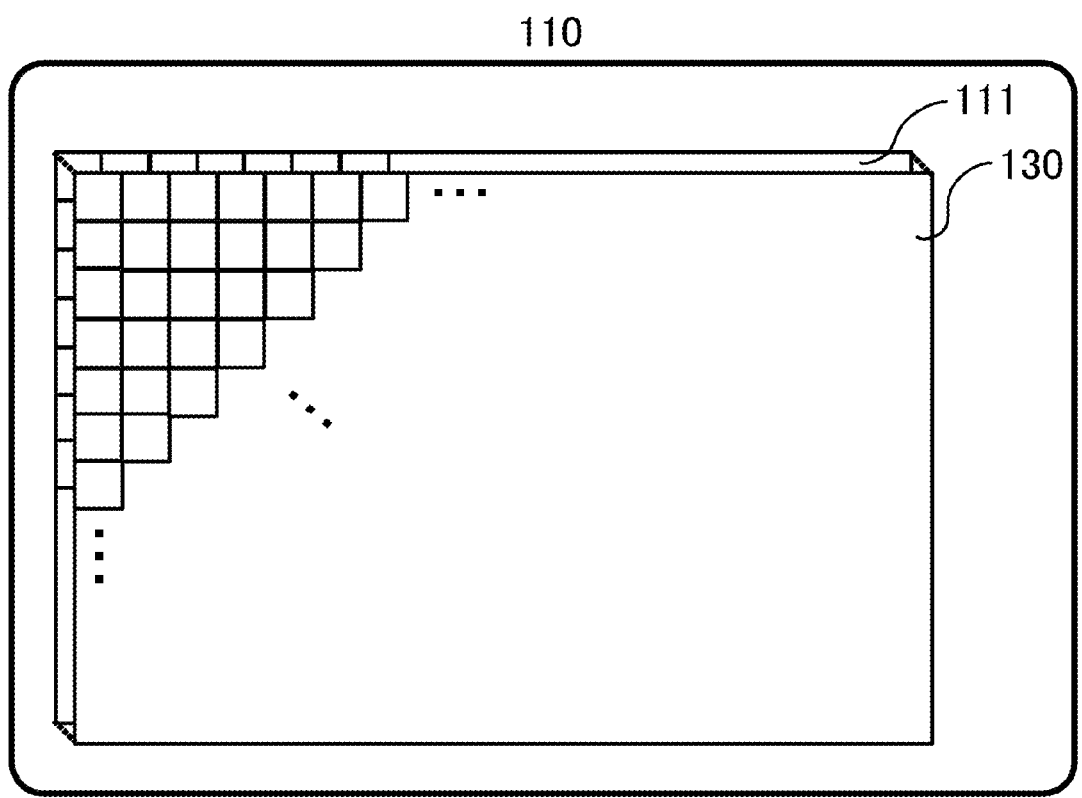
FIG. 1 is a schematic diagram of an image sensor of a multiband image acquisition system according to each embodiment of the present invention.

FIG. 1 is a schematic diagram of an image-pickup unit 110 of a multiband image acquisition system (image processing system) according to an embodiment of the present invention. The multiband image acquisition system acquires a multiband image made of spectral images of four or more different wavelength bands. The image-pickup unit 110 includes an image sensor 111 and a color filter 130 disposed on an object side of the image sensor 111. The image sensor 111 includes a plurality (M×N) of pixels configured to perform image pickup of an object.

Figure 2:
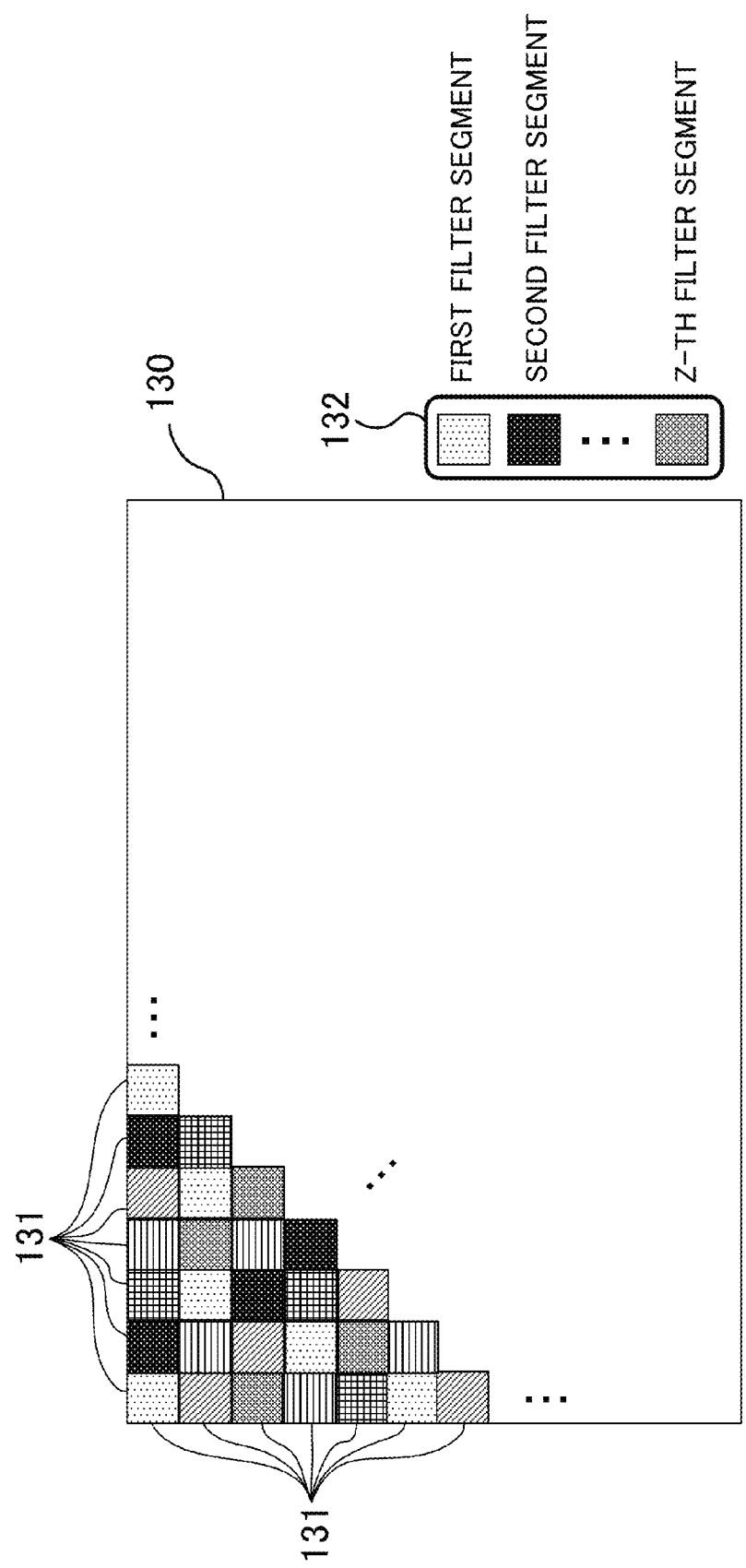
FIG. 2 is a schematic diagram of the color filter illustrated in FIG. 1.

FIG. 2 is a schematic diagram of a configuration of the color filter 130. As illustrated in FIG. 2, the color filter 130 includes a plurality of filter segments 131 each configured to receive light from the object, serving as a color filter. The plurality of filter segments 131 are disposed two-dimensionally (in a matrix array). Each filter segment 131 corresponds to one of the pixels of the image sensor 111. The plurality of filter segments 131 include first to Z-th filter segments 132 having spectral transmittances for different wavelength bands of the light from the object. For example, the plurality of filter segments 131 may include a plurality of sets of the first to Z-th filter segments 132. In this case, the first to Z-th filter segments 132 are arranged differently between the sets (irregularly arranged).

Figure 3A:
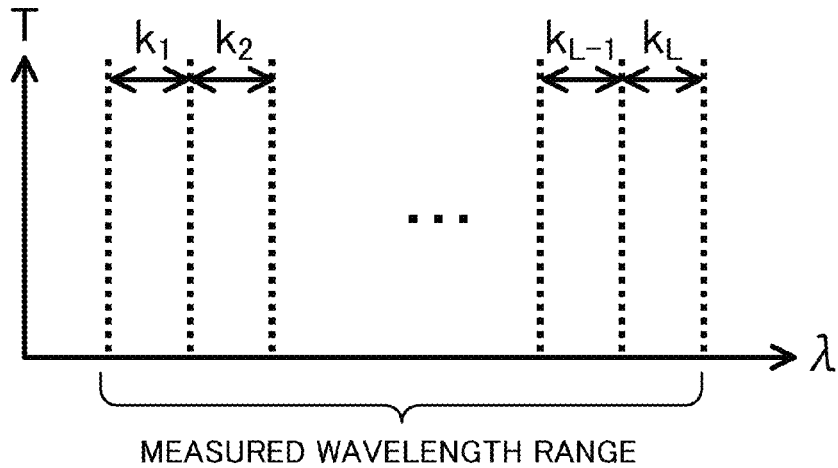
FIGS. 3A to 3C each illustrate bands that can be acquired by the multiband image acquisition system according to the embodiment.
Figure 3B:
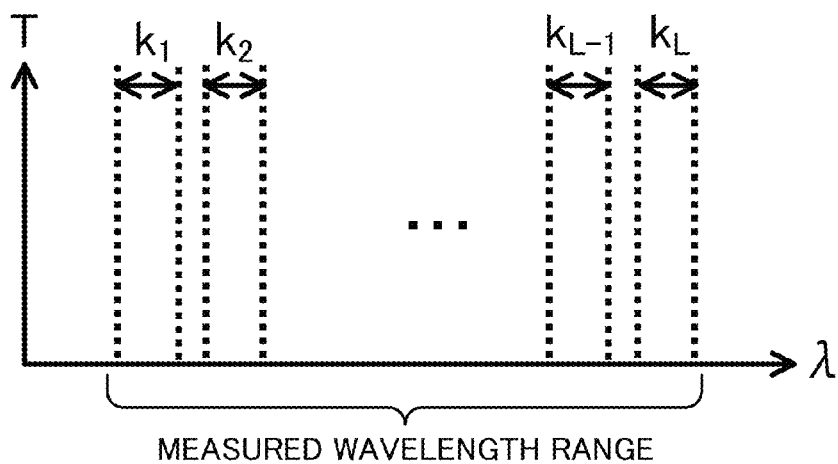
Figure 3C:
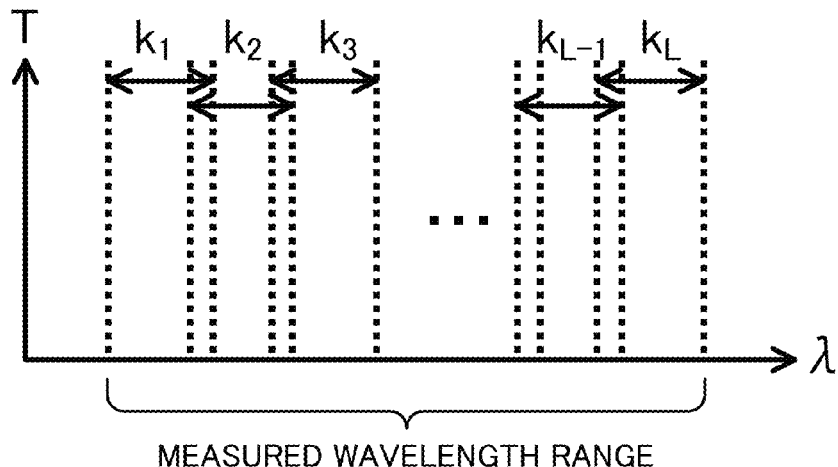

FIGS. 3A to 3C each illustrate wavelength bands obtainable by appropriately selecting the spectral characteristic of the color filter 130. In FIGS. 3A to 3C, a horizontal axis represents a wavelength λ, and a vertical axis represents a spectral transmittance T. FIG. 3A illustrates an example of acquiring a multiband image of L different wavelength bands in a measured wavelength range. FIG. 3B illustrates an example of acquiring a multiband image of L different wavelength bands having intervals between them. FIG. 3C illustrates an example of acquiring a multiband image of L different wavelength bands overlapping between neighbors.

Figure 4:
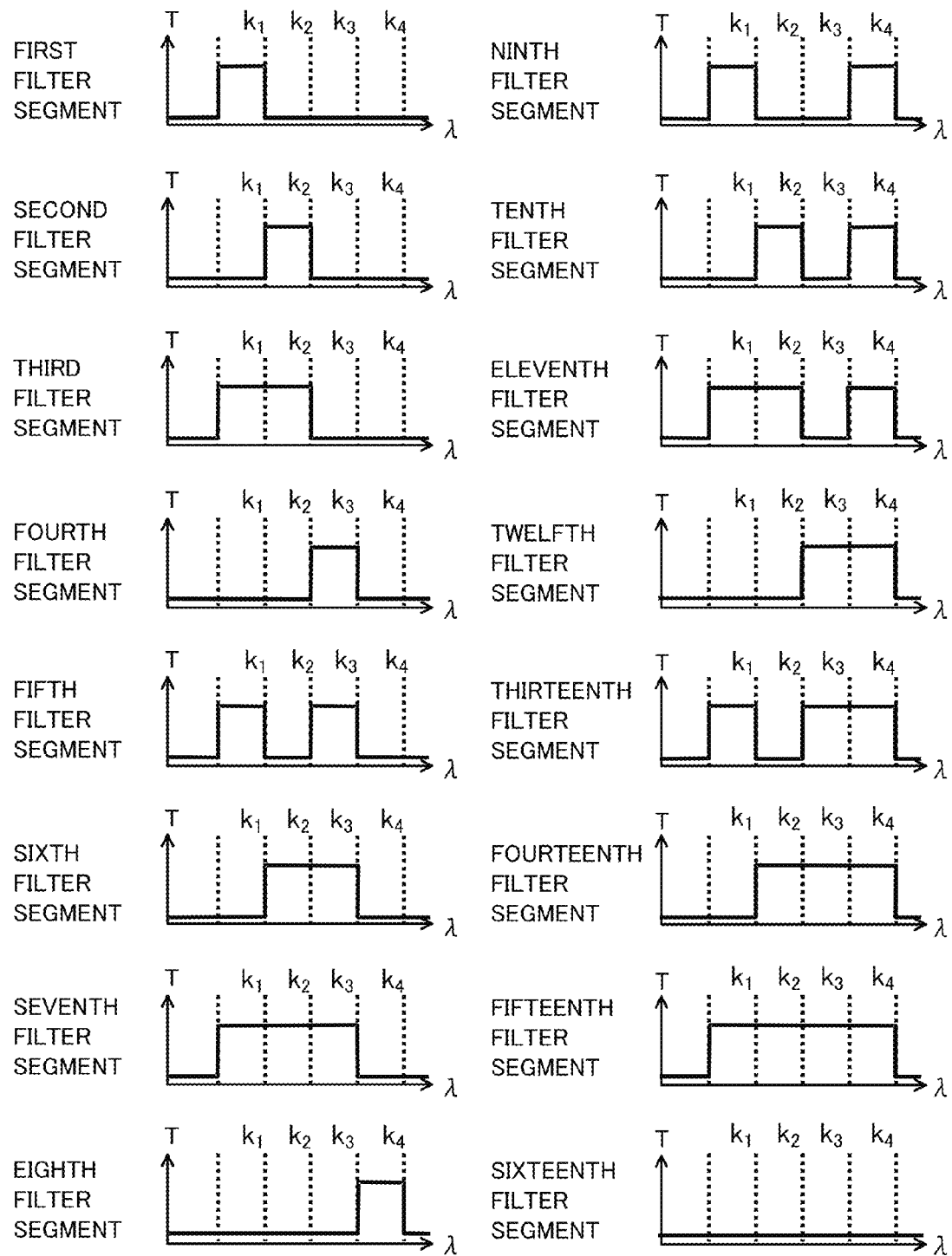
FIG. 4 illustrates an exemplary spectral transmittance characteristic of the color filter illustrated in FIG. 2.
Figure 5A:
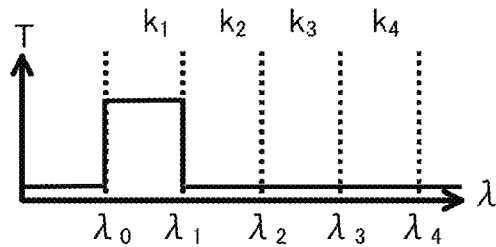
FIGS. 5A to 5H each illustrate a relationship between a bandwidth and a spectral transmittance characteristic of a filter segment illustrated in FIG. 2.
Figure 5E:
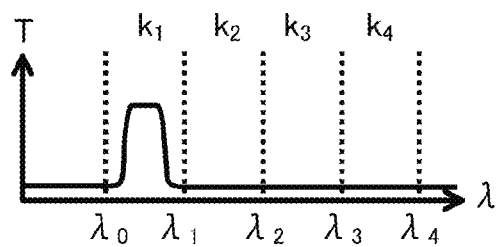
Figure 5B:
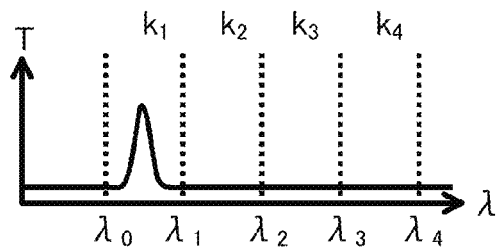
Figure 5F:
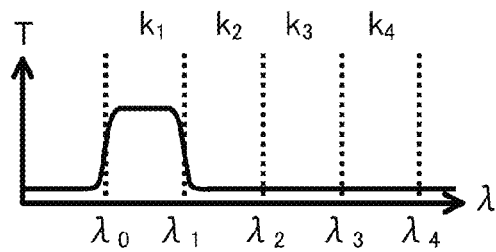
Figure 5C:
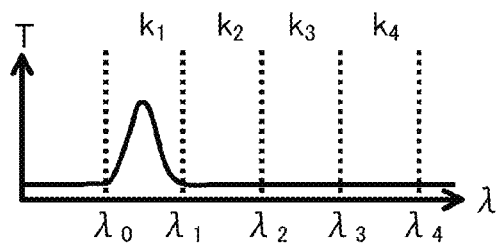
Figure 5G:
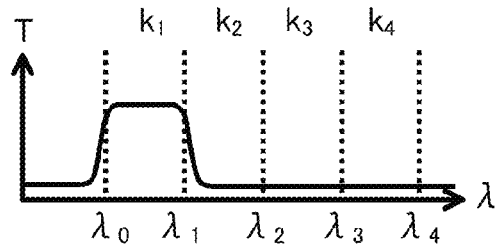
Figure 5D:
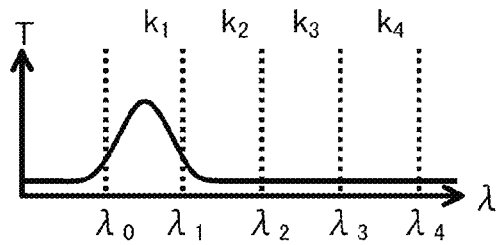
Figure 5H:
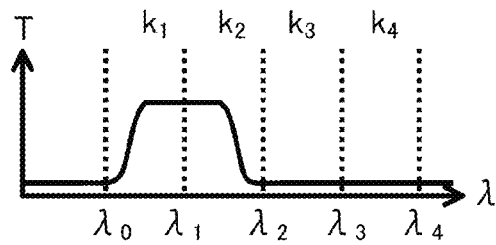

FIG. 4 illustrates an exemplary spectral transmittance characteristic with the number of wavelength bands L=4 and the number of filter segments Z=16. In FIG. 4, a horizontal axis represents the wavelength λ, and a vertical axis represents the spectral transmittance T. First to sixteenth filter segments have spectral transmittance characteristics different from each other, including a filter segment that only transmits light of a single wavelength band, and a filter segment that transmits light of a plurality of wavelength bands. The filter segment that only transmits light of a single wavelength band functions as a primary color filter. The filter segment that transmits light of a plurality of wavelength bands functions as a complementary color filter. Employing a plurality of complementary color filters increases the amount of incident light to be taken in.

The phrase "different spectral transmittance characteristics" means that transmitted wavelength bands of the light from the object are different from each other. For example, when a filter segment has the same characteristic as that of the first filter segment in FIG. 4 except for a different spectral transmittance in the same wavelength band, such as a lower spectral transmittance T in a wavelength band $k_1$, this filter segment is regarded as having the same spectral transmittance characteristic as that of the first filter segment. Once a target wavelength band is determined, the "different spectral transmittance characteristics" exclude characteristics of having transmitted wavelength bands different from each other within the same wavelength band (for example, shorter and longer transmitted wavelength ranges within the determined wavelength band $k_1$).

When equal numbers of filter segments having the spectral characteristics illustrated in FIG. 4 are disposed on the color filter 130, 50% of an incident light amount is received for each wavelength band. This value is higher than the value of 25% obtained with primary color filters disposed in a matrix array and the same number (or four) of wavelength bands as disclosed in U.S. Patent Application Publication No. 2010/0140461. This indicates that the image-pickup unit 110 allows a large amount of incident light to be taken in.

In this embodiment, a condition below allows a large amount of incident light to be taken in even when the number of wavelength bands is increased:

$$0.4 \leq \frac{1}{L}\sum_{k=1}^{L} \frac{P_k}{MN} \leq 0.9 \qquad (1)$$

$$2^{L-1} \leq Z \leq 2^L \qquad (2)$$

where L is an integer equal to or larger than four, and $P_k$ is the number of pixels that receive light of a wavelength band k (k=1, 2, . . . , L).

Since the color filter 130 includes a plurality of complementary color filters, the image sensor 111 includes a large number of pixels each having color information of mixed bands. Thus, each wavelength band information needs to be taken out of the pixels having mixed color information so as to obtain a multiband image of the number of wavelength bands L.

This embodiment employs image estimation processing described later to pick up each wavelength band from the pixels having mixed color information. Expressions (1) and (2) are conditional expressions to be satisfied so as to take in a large amount of incident light and facilitate the separation of each wavelength band from the pixels receiving mixed light in the image estimation processing.

Expression (1) indicates that a larger number of filter segments than normal are included. A value exceeding the lower limit of Expression (1) facilitates the separation of each wavelength band but reduces the amount of incident light to be taken in. A value exceeding the upper limit increases the amount of incident light to be taken but makes difficult the separation of each wavelength band.

Expression (2) indicates that one pixel receives light of a plurality of wavelength bands. Color filters (filter segments) having such a number of spectral characteristics that Expression (2) with the number of wavelength bands L is satisfied need to be provided. Otherwise, it is difficult to achieve both the intake of a large amount of incident light and the facilitation of the separation of each wavelength band obtained from the pixels having mixed color information in the image estimation processing.

In addition, the first to Z-th filter segments 132 need to be irregularly disposed to facilitate the separation of each wavelength band obtained from the pixels having mixed color information in the image estimation processing.

FIGS. 5A to 5H illustrate a relationship between a wavelength band width and the spectral characteristic of each filter segment 131. In FIGS. 5A to 5H, a horizontal axis represents the wavelength λ, and a vertical axis represents the spectral transmittance T. As illustrated in FIGS. 5A to 5H, the amount of incident light in each wavelength band depends on the spectral transmittance of the filter segment 131. A pixel that receives light of the wavelength band k is configured to have such an average transmittance at the wavelength band k that a condition below is satisfied so as to achieve a highly sensitive image capturing with an increased amount of incident light.

$$0.1 \leq \frac{1}{(\lambda_k - \lambda_{k-1})} \int_{\lambda_{k-1}}^{\lambda_k} T(\lambda) d\lambda \leq 1 \qquad (3)$$

Here, $\lambda_{k-1}$ represents the shortest wavelength in the wavelength band k, $\lambda_k$ represent the longest wavelength therein, and T(λ) represents the spectral transmittance of the filter segment 131 corresponding to the wavelength band k.

When Expression (3) is satisfied for wavelength band 1, the pixel receives light of wavelength band 1. When Expression (3) is not satisfied, the pixel does not receive the light of wavelength band 1. This also applies to neighboring wavelength bands. With the spectral transmittance of the filter segment illustrated in FIG. 5H, the pixel receives light of wavelength bands 1 and 2.

Figure 6:
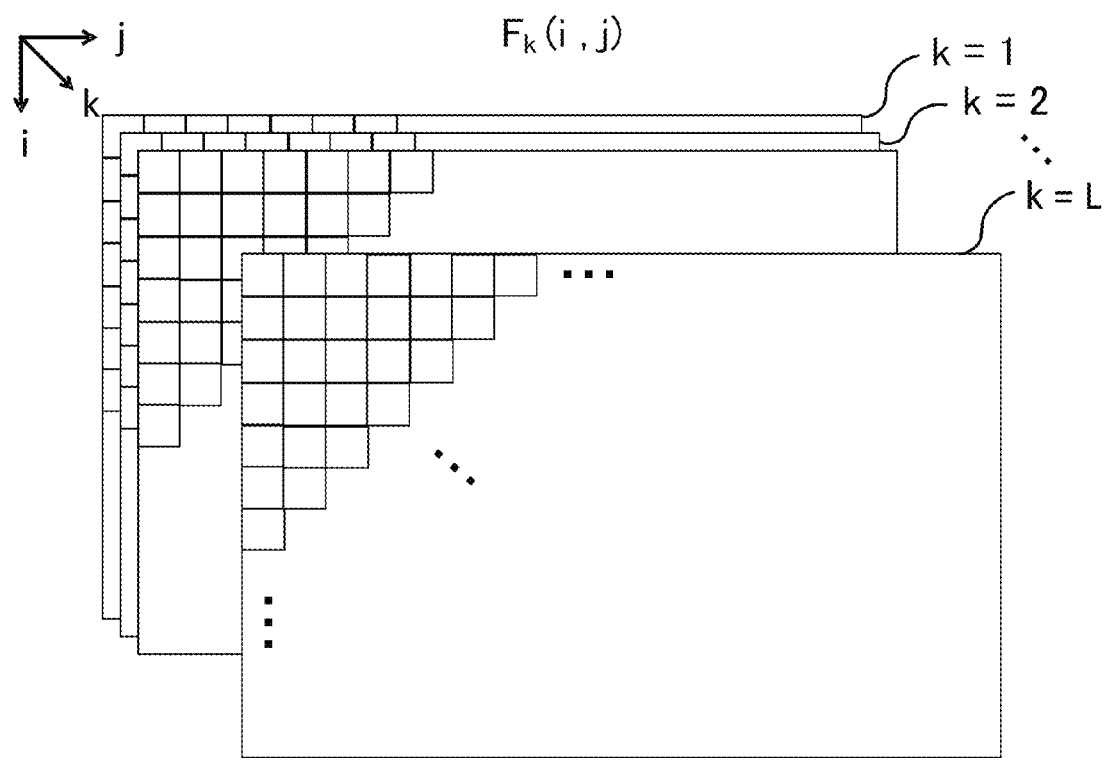
FIG. 6 illustrates a spectral characteristic structure of the color filter according to the embodiment.

FIG. 6 three-dimensionally illustrates the spectral characteristic structure of the color filter 130. The structure in FIG. 6 has a distribution $F_k(i,j)$ (where i=1, 2, . . . , M, and j=1, 2, . . . , N) of the transmittance characteristic of the color filter corresponding to the wavelength band k (k=1, 2, . . . , L) for the number of wavelength bands L. $F_k(i,j)$ represents the average transmittance calculated on the left-hand side of Expression (3). With this structure, the color filter 130 satisfies a condition below.

$$0.1 \le \frac{1}{(L-1)L}\left(\sum_{k_1=1}^{L}\sum_{k_2=1}^{L} R_{k_1,k_2} - L\right) \le 0.9 \text{ where} \quad (4)$$

$$R_{k_1,k_2} = \frac{\sum_{j=1}^{N}\sum_{i=1}^{M} F_{k1}(i,j)F_{k2}(i,j)}{\sqrt{\sum_{j=1}^{N}\sum_{i=1}^{M} F_{k1}(i,j)^2 \times \sum_{j=1}^{N}\sum_{i=1}^{M} F_{k2}(i,j)^2}} \quad (5)$$

Here, $R_{k1,k2}$ represents a cross-correlation between distributions $F_{k1}$ and $F_{k2}$ of spectral transmittances in wavelength bands $k_1$ and $k_2$, that is, represents an average value of the cross-correlation between the wavelength bands in Expressions (4) and (5). $R_{k1,k2}$ is 0.5 when no cross-correlation is present between the wavelength bands $k_1$ and $k_2$, and becomes closer to 1.0 for a stronger positive cross-correlation and to 0.0 for a stronger negative cross-correlation.

No cross-correlation is necessary between the wavelength bands in separating each wavelength band obtained from the pixels having mixed color information in the image estimation processing, and Expressions (4) and (5) specify an appropriate range for this. Expressions (4) and (5) also represent the irregular disposition of the first to Z-th filter segments 132.

A condition (4') below may be satisfied in place of Expression (4).

$$0.3 \le \frac{1}{(L-1)L}\left(\sum_{k_1=1}^{L}\sum_{k_2=1}^{L} R_{k_1,k_2} - L\right) \le 0.7 \quad (4')$$

Figure 7:
FIG. 7 illustrates an exemplary spectral characteristic of the color filter illustrated in FIG. 2.

FIG. 7 illustrates an exemplary spectral transmittance characteristic of the color filter 130 when the number of pixels is 64×64 and the number of wavelength bands is 4. In FIG. 7, a white part represents transmission of light, and a black part represents non-transmission of light. In this example, the transmittance distribution $F_k(i,j)$ is generated with random numbers. Expression (4) has a value of 0.5011 in this case, indicating almost no cross-correlation between the wavelength bands.

Figure 8A:
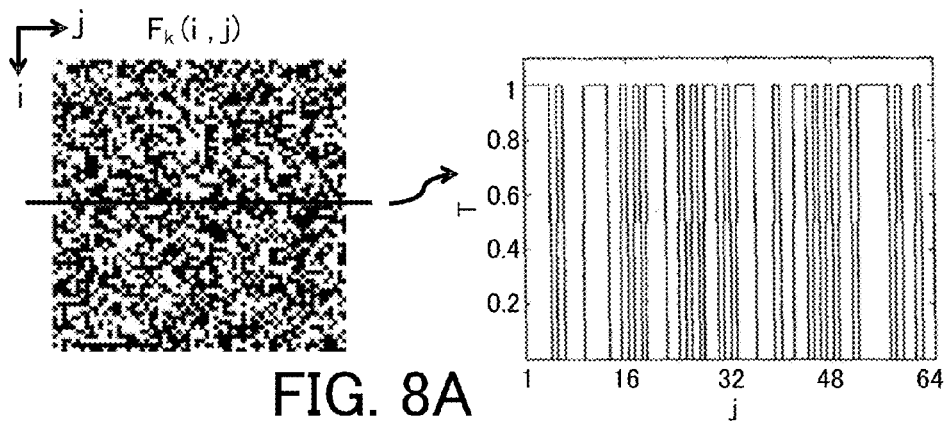
FIGS. 8A to 8D each illustrate an exemplary value of a transmissivity characteristic of the color filter illustrated in FIG. 2.
Figure 8B:
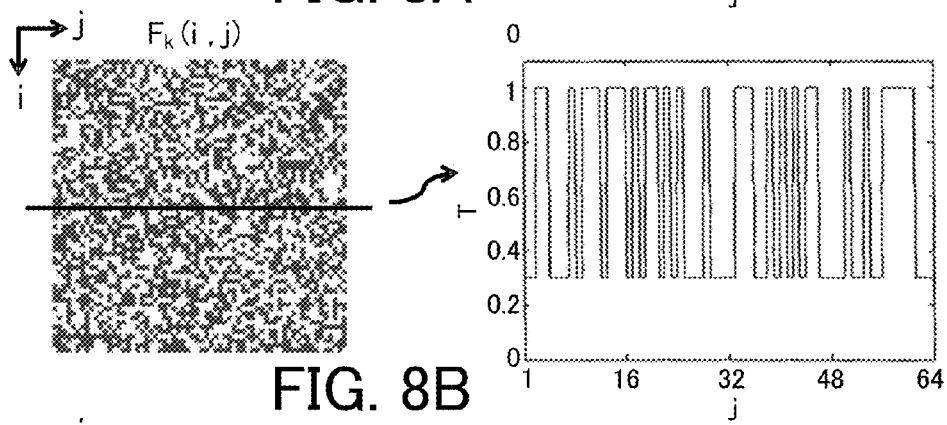
Figure 8C:
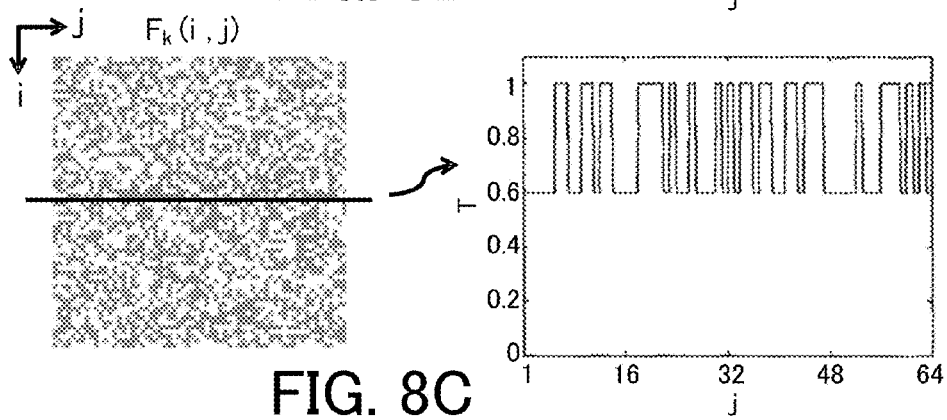
Figure 8D:
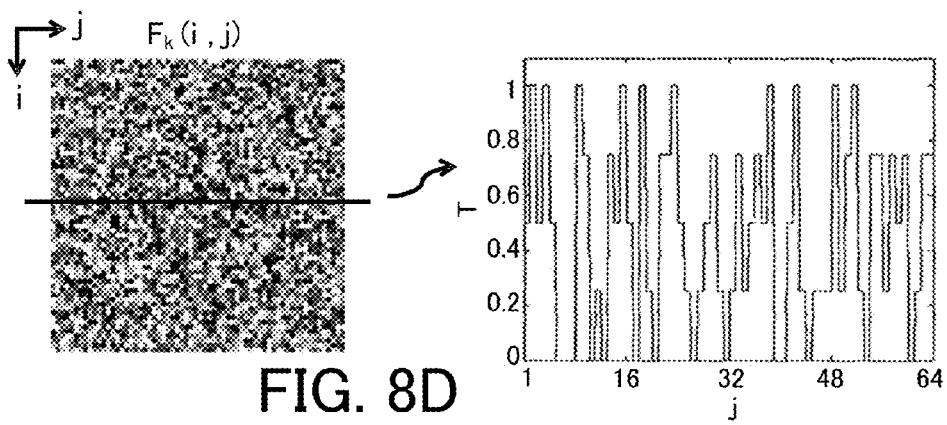

FIGS. 8A to 8D illustrate variations of the distribution of the transmittance characteristic of the color filter 130 when the number of pixels is 64×64 and the wavelength band is k. FIGS. 8A to 8D each illustrate, on the right side, a sectional profile of the transmittance taken along a straight line on the left side diagram. The minimum value of $F_k(i,j)$ may be zero as illustrated in FIG. 8A, or may be non-zero as illustrated in FIGS. 8B and 8C. In addition, $F_k(i,j)$ may be a transmittance distribution of a plurality of gradations as illustrated in FIG. 8D. Although the transmittance distributions illustrated in FIGS. 8B to 8D allow a larger amount of light to be taken in, this increase in the amount of light makes it difficult to separate each wavelength band obtained from the pixels having mixed color information in the image estimation processing. A ratio of $\min(F_k(i,j))$ as the minimum value of $F_k(i,j)$ and $\max(F_k(i,j))$ as the maximum value thereof may satisfy a condition below.

$$0.0 \le \frac{\min(F_k(i,j))}{\max(F_k(i,j))} \le 0.6 \quad (6)$$

Figure 9A:
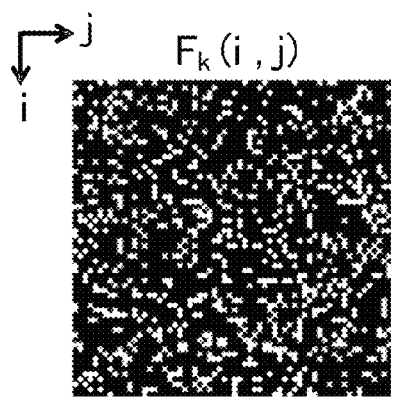
FIGS. 9A to 9C each illustrate an exemplary distribution of the transmissivity characteristic of the color filter illustrated in FIG. 2.
Figure 9B:
Figure 9C:
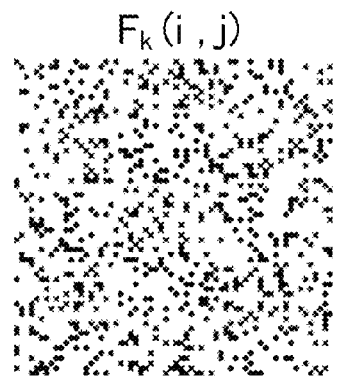

FIGS. 9A to 9C illustrate variations of the distribution of the transmittance characteristic of the filter segment 131 when the number of pixels is 64×64 and the wavelength band is k. When $P_{min}$ represents the number of pixels having the minimum transmittance of $F_k(i,j)$, and $P_{max}$ represents the number of pixels having the maximum transmittance of $F_k(i,j)$, the distribution in FIG. 9A has $P_{max}/P_{min}=0.25$, the distribution in FIG. 9B has $P_{max}/P_{min}=1$, and the distribution in FIG. 9C has $P_{max}/P_{min}=4$. Although a larger ratio $P_{max}/P_{min}$ allows a larger amount of light to be taken in, this increase in the amount of light makes it difficult to separate each wavelength band obtained from the pixels having mixed color information in the image estimation processing. The ratio $P_{max}/P_{min}$ may satisfy a condition below.

$$0.25 \le \frac{P_{max}}{P_{min}} \le 4.0 \quad (7)$$

Figure 10:
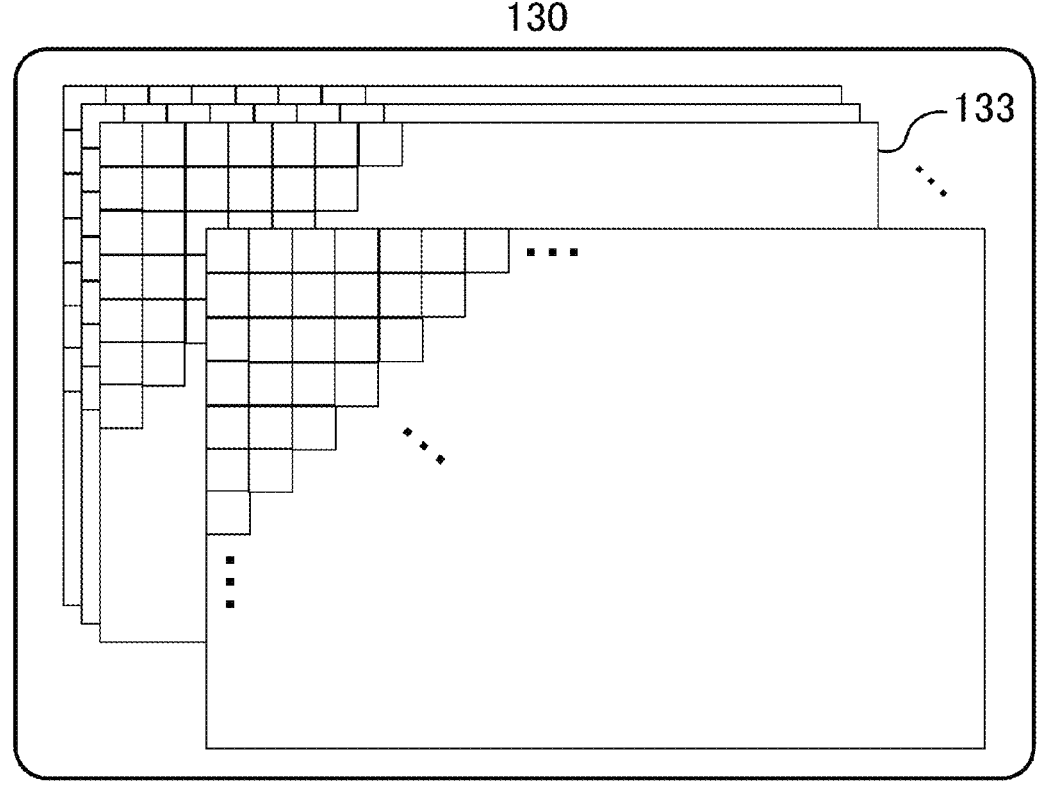
FIG. 10 illustrates an exemplary configuration of the color filter illustrated in FIG. 2.

FIG. 10 illustrates an exemplary configuration of the color filter 130. The color filter 130 includes a stack of color filter layers 133 corresponding to respective wavelength bands.

FIGS. 11A to 11E are schematic diagrams for describing a process of manufacturing the color filter layer 133. First, the manufacturing process applies a transparent substrate 134 illustrated in FIG. 11A with a photoresist 135 illustrated in FIG. 11B, and then forms a negative resist pattern illustrated in FIG. 11C for the color filter 130 through a patterning process and a liftoff process. The manufacturing process then forms, on this negative resist pattern, an optical element (notch filter, absorption material that absorbs light of a particular wavelength band, and plasmonic filter, for example) 136 that reflects or absorbs light of the wavelength band k as illustrated in FIG. 11D. Finally, as illustrated in FIG. 11E, the manufacturing method removes the negative resist pattern to produce the color filter layer 133.

In FIG. 11E, a part where the optical element 136 is formed does not transmit light of the wavelength band k, and a part where the optical element 136 is not formed transmits light of all wavelength bands. The color filter 130 is obtained by stacking the color filter layers 133 corresponding to respective wavelength bands. An antireflection film may be provided to reduce a reflection loss at the color filter layer 133. The process illustrated in FIGS. 10 and 11A to 11E is merely an exemplary process of manufacturing the color filter 130.

The use of the color filter 130 allows a highly sensitive compressed multiband image to be acquired by a single image capturing through a single-time imaging system.

In this embodiment, pixels for respective wavelength bands are irregularly disposed as illustrated in FIG. 7 so as to take in a large amount of incident light and to facilitate the separation of each wavelength band obtained from the pixels having mixed color information in the image estimation processing. Thus, color moire caused when pixels are regularly disposed like a Bayer array is less likely to be produced in principle. This allows the image-pickup unit 110 to maintain its performance without an optical low-pass filter in some cases.

Embodiment 1

Next follows, with reference to FIGS. 12A to 12C and FIG. 13, a description of the image estimation processing that estimates a multiband image f of M×N pixels×L different wavelength bands based on a captured image g as a compressed multiband image of M×N pixels.

Figure 12A:
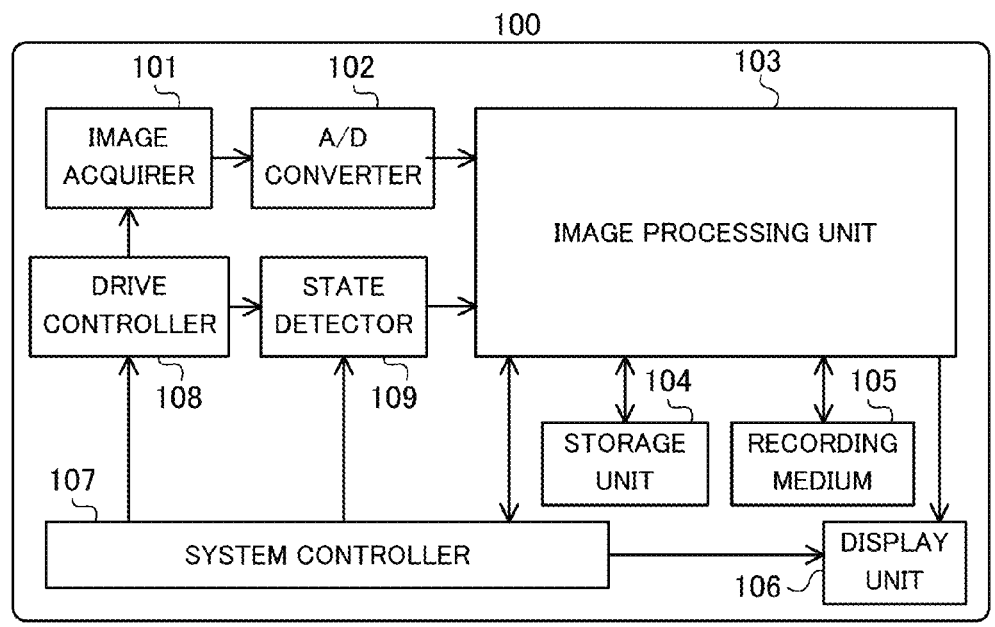
FIGS. 12A to 12C are a block diagram, an external perspective diagram, a partial perspective diagram of the multiband image acquisition system according to Embodiment 1 of the present invention.
Figure 12B:
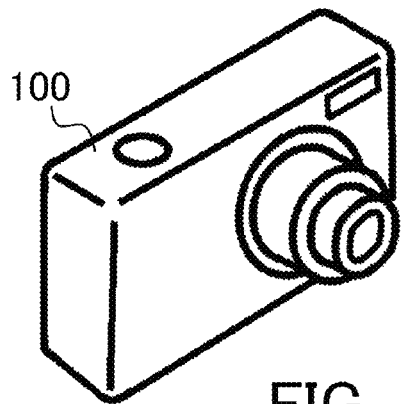
Figure 12C:
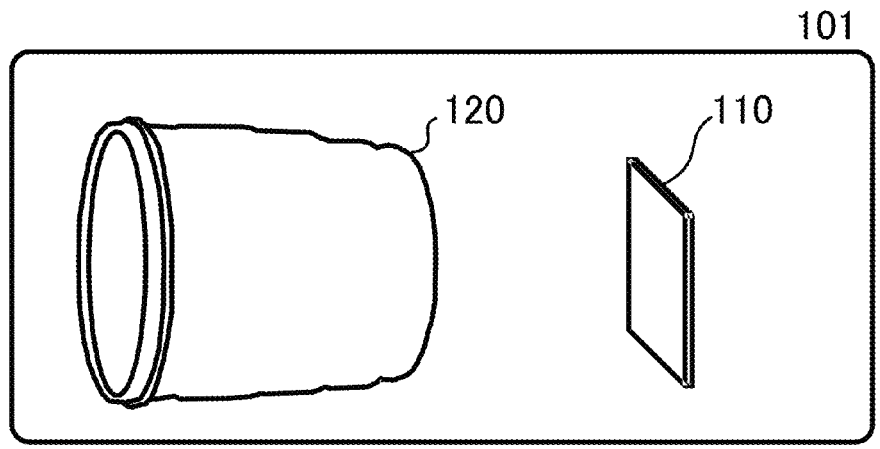

FIG. 12A is a block diagram of a multiband image acquisition system 100 according to Embodiment 1 of the present invention. FIG. 12B is an external perspective diagram of an example of the multiband image acquisition system 100. FIG. 12C illustrates an example of an image acquirer 101.

The multiband image acquisition system 100 includes the image acquirer 101, an A/D converter 102, an image processing unit 103, a storage unit 104, a recording medium 105, a display unit 106, a system controller 107, a drive controller 108, and a state detector 109. The multiband image acquisition system 100 may be a lens-integrated image-pickup apparatus illustrated in FIG. 12B, or an image-pickup system including an interchangeable lens and an image-pickup apparatus body.

The image acquirer 101 includes, as illustrated in FIG. 12C, a nonillustrated single-time imaging optical system (image-pickup optical system) 120 that forms an object image, and the image-pickup unit 110 illustrated in FIG. 1 that photoelectrically converts the object image. The A/D converter 102 converts an analog signal from the image sensor 111 into a digital signal. The image processing unit (image processor) 103 provides the digital signal with various pieces of image processing and performs the image estimation processing. The storage unit (storage) 104 includes various memories such as ROM, RAM, and the like, and stores information of the spectral transmittance of the filter segment 131, various pieces of control information, variables, temporally stored values, programs, and image signals processed by the image processing unit 103. The recording medium 105 includes a non-transitory computer-readable medium such as DVD-ROM. The display unit 106 includes, for example, a liquid crystal display, and displays an image to be captured, captured images stored in the storage unit 104 and the recording medium 105, and various pieces of control information. The system controller 107 is a controller that controls an operation of each component and includes a micro computer. The drive controller 108 controls drive of a focus lens, a zoom lens, an aperture stop, an image stabilization lens, and the like of the imaging optical system. The state detector 109 is a detection unit that detects various states including an image capturing condition of the multiband image acquisition system 100.

Figure 13:
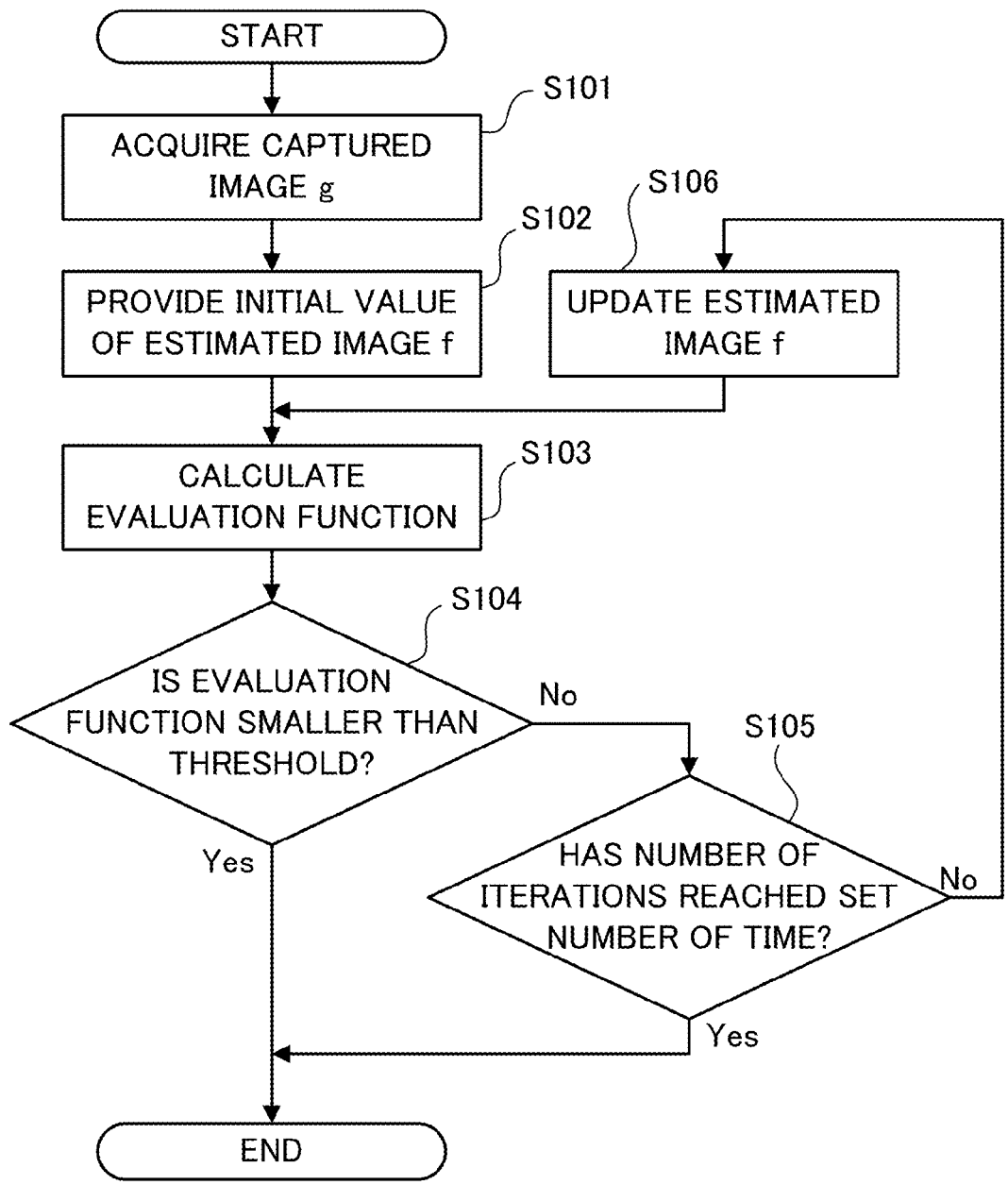
FIG. 13 is a flowchart of a process of a system controller illustrated in FIGS. 12A to 12C according to Embodiment 1.

FIG. 13 is a flowchart of a process of the system controller 107 to obtain a multiband image from a captured image, in which "s" represents a step. The flowchart illustrated in FIG. 13 may be realized as a program that causes a computer to execute each step.

First, at S101, a captured image g digitalized through the image acquirer 101 and the A/D converter 102 is acquired. Next, at S102, the image processing unit 103 provides an initial value of an estimated image f. Next, at S103, the image processing unit 103 calculates an evaluation function. Next, at S104, the image processing unit 103 determines whether the evaluation function calculated at S103 is smaller or larger than a threshold. When the evaluation function is smaller than the threshold, the image processing unit 103 determines that the estimated image f is appropriate, and outputs the estimated image f before ending the process. When the evaluation function is larger than the threshold, the image processing unit 103 determines that the estimation of the estimated image f is insufficient, and the process proceeds to S105, where the image processing unit 103 counts the number of iterations of the estimation processing and ends the processing when a set number of times is reached. When the number of iterations has not reached the set number of times, the process proceeds to S106, where the image processing unit 103 updates the estimated image f. Then, the process repeats S103 to S106 until the processing ends eventually. The estimated image f obtained at the end is recorded on the recording medium 105, or displayed on the display unit 106.

The image estimation processing in Embodiment 1 employs the evaluation function using the transmittance characteristic $F_k(i,j)$ of the color filter 130. The transmittance characteristic $F_k(i,j)$ is known, and its information is stored in the storage unit 104. When $F_k(i,j)$ represents the estimated image of the wavelength band k, an image g' captured through the color filter 130 is expressed by Expression (8) below.

$$g' = \sum_{k=1}^{L} F_k f_k + \eta \quad (8)$$

Here, $\eta$ is a noise term. Then, whether the estimated image f is appropriate can be evaluated by Expression (9) below.

$$\|g - g'\|_2^2 = \left\| g - \sum_{k=1}^{L} F_k f_k \right\|_2^2 \quad (9)$$

In this manner, the appropriateness of the estimated image $F_k(i,j)$ can be checked by using the transmittance characteristic $F_k(i,j)$ of the color filter 130 and the captured image g. The evaluation function is not limited to an L2-norm such as Expression (9), and may be any function using the transmittance characteristic $F_k(i,j)$ of the color filter 130, and may be, for example, an L1-norm such as Expression (9') below.

$$\|g - g'\|_1 = \left\| g - \sum_{k=1}^{L} F_k f_k \right\|_1 \quad (9')$$

However, the estimation of $F_k(i,j)$ that minimizes Expressions (9) and (9') is insufficient. This is because the estimation with Expressions (9) and (9') is invalid in a part where the transmittance characteristic $F_k(i,j)$ is zero. This is likely to cause a pixel defect (lack of image information) in a part where $F_k(i,j)=0$ in the image $F_k(i,j)$ estimated with Expressions (9) and (9').

Thus, a process to interpolate a pixel defect part may be provided at the same time. Specifically, Expression (10) below is employed as the evaluation function.

$$\left\| g - \sum_{k=1}^{L} F_k f_k \right\|_2^2 + \gamma \phi(f) \qquad (10)$$

Here, $\phi(f)$ is called a regularization term, which is used to interpolate the pixel defect part. $\gamma$ is a parameter for adjusting the effect of the regularization term, and needs to be adjusted in accordance with the kind of the captured image g as appropriate.

The regularization term $\phi(f)$ is, for example, a total variation (TV) norm regularization term in Expression (11).

$$\phi(f) = \sum_{k=1}^{L} \sum_{j=1}^{N-1} \sum_{i=1}^{M-1} \sqrt{\{f_k(i+1, j) - f_k(i, j)\}^2 + \{f_k(i, j+1) - f_k(i, j)\}^2} \qquad (11)$$

However, the regularization term $\phi(f)$ is not limited thereto.

The series of image estimation processes illustrated in FIG. 13 may be performed by using a fast image estimation processing algorithm such as TwIST algorithm disclosed by J. M. Bioucas-Dias and M. A. T. Figueiredo, "A new TwIST: two-step iterative shrinkage/thresholding algorithms for image restoration, IEEE Trans. *on Image Processing*, vol. 16, Dec. 2007.

FIGS. 14A to 14D illustrate a captured image acquired by the multiband image acquisition system 100 and simulation results of multiband images produced from the captured image. The images used in the simulation are of 256×256 pixels and 31 wavelength bands, and the TwIST algorithm was used in the image estimation processing.

Figure 14A:
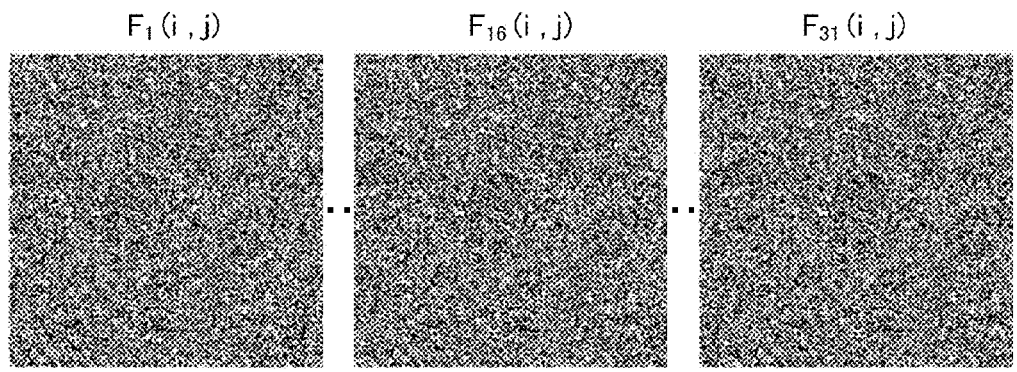
FIGS. 14A to 14D illustrate simulation results of multiband images produced from a captured image by an image estimating processing illustrated in FIG. 13 according to Embodiment 1.
Figure 14B:
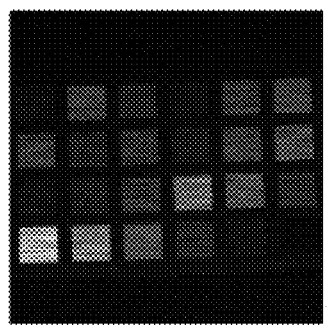
Figure 14C:
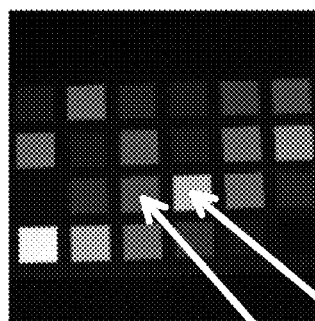
Figure 14D:
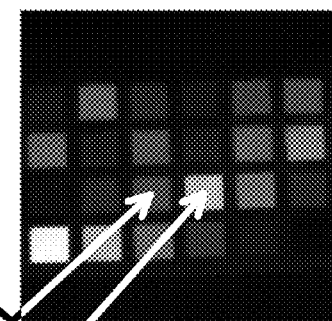

FIG. 14A illustrates parts (k=1, 16, 31) of the transmittance characteristic $F_k(i,j)$ of the filter segment 131. FIG. 14B illustrates the captured image g. FIG. 14C illustrates an RGB image produced from a multiband image of a correct image. FIG. 14D illustrates an RGB image produced from a multiband image of the estimated image $F_k(i,j)$. As described above, a display image may be produced from a multiband image.

Figure 15A:
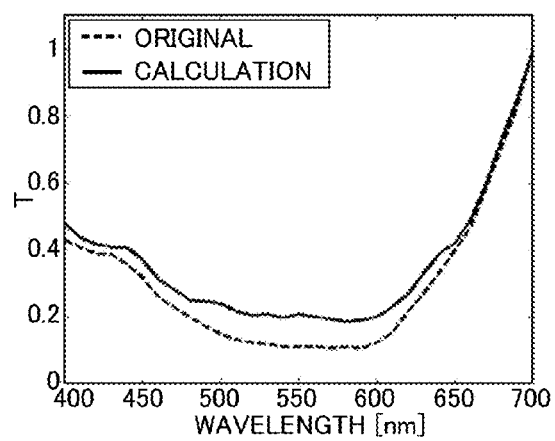
FIGS. 15A and 15B are graphs each comparing a spectral characteristic of each multiband image in FIGS. 14A to 14D with a correct spectral transmittance according to Embodiment 1.
Figure 15B:
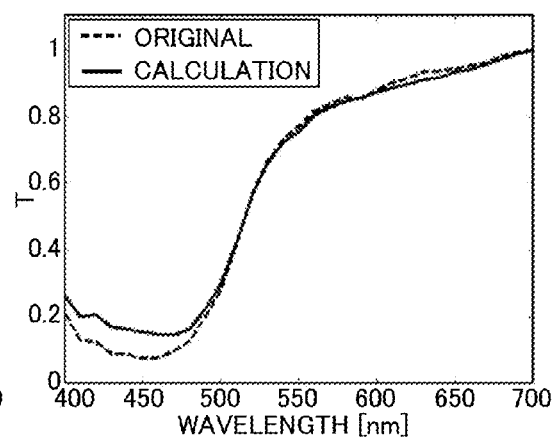

FIG. 15A compares spectral transmittances at corresponding points A in FIGS. 14C and 14D, and FIG. 15B compares spectral transmittances at corresponding points B in FIGS. 14C and 14D. In FIGS. 15A and 15B, a horizontal axis represents the wavelength (nm), and a vertical axis represents the spectral transmittance. In FIGS. 15A and 15B, a dotted line represents a correct (original) spectral transmittance, and a solid line represents a spectral transmittance calculated by the image estimating processing in Embodiment 1. The comparison indicates that the image estimating processing in this embodiment accurately estimates the spectral transmittance.

Embodiment 1 allows, for example, the small compact digital camera illustrated in FIG. 12B to acquire a highly sensitive multiband image.

Embodiment 2

Figure 16A:
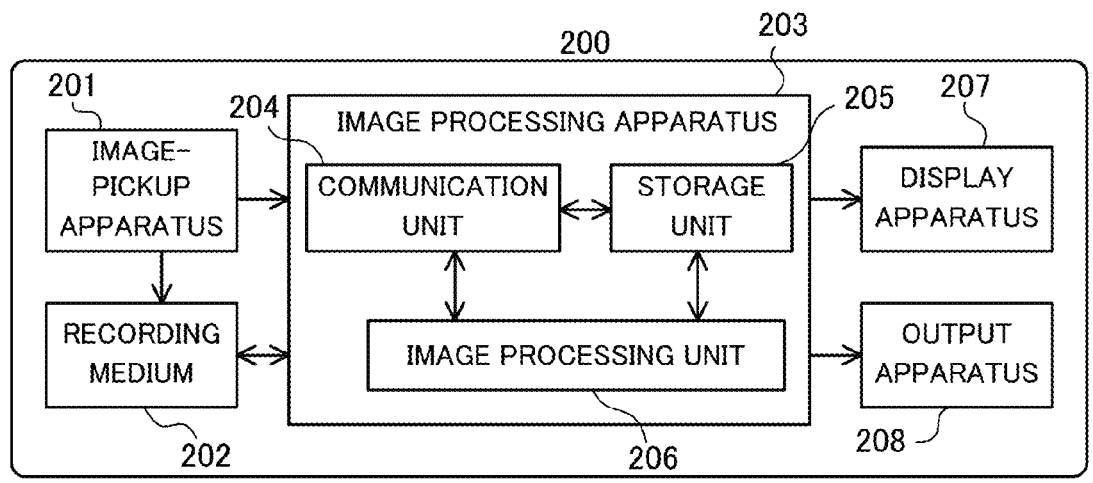
FIGS. 16A and 16B are a block diagram and a system configuration diagram of a multiband image acquisition system according to Embodiment 2 of the present invention.
Figure 16B:
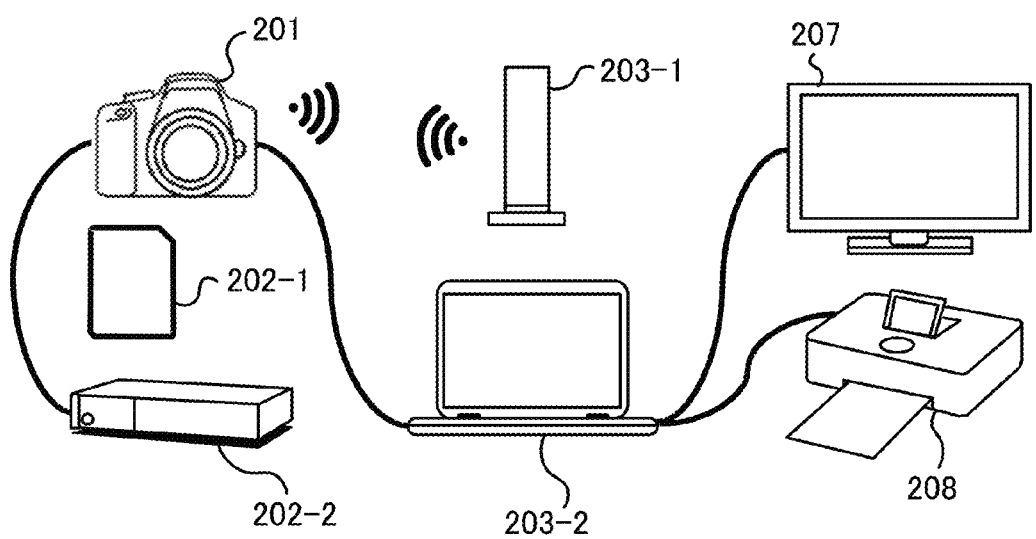

In Embodiment 1, the image processing unit of the image-pickup apparatus performs processing for producing a multiband image, but a personal computer (PC) or a dedicated apparatus may perform sharpening as an image processing apparatus. FIG. 16A is a block diagram of a multiband image acquisition system according to Embodiment 2. FIG. 16B is a system configuration diagram thereof. Embodiment 2 differs from Embodiment 1 in that an image-pickup apparatus 201 and an image processing apparatus 203 are separately provided in Embodiment 2.

The image-pickup apparatus 201 such as a single-lens reflex camera is used to acquire the captured image g. Then, the captured image g is recorded on a non-transitory computer-readable recording medium 202 such as an SD card 202-1 and a hard disk 202-2. The captured image g thus recorded is stored on a storage unit 205 in the image processing apparatus 203 through a USB cable and various networks (LAN and the Internet), and a communication unit 204. The image processing apparatus 203 may be a PC 203-1 and cloud computing 203-2. Then, an image processing unit 206 provides the image estimation processing and calculates the estimated image f. The estimated image f thus calculated is stored on the storage unit 205, displayed on a display apparatus 207 such as a liquid crystal display, or output to an output apparatus 208 such as a printer.

In Embodiment 2, the image estimation processing, which is heavily-loaded, is performed by using the PC 203-1 and the cloud computing 203-2, which allows a user to easily obtain a highly sensitive multiband image.

Other Embodiments

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment (s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-235305, filed on Nov. 20, 2014, which is hereby incorporated by reference herein in its entirety.

What is claimed is:

1. An image-pickup unit comprising:
an image sensor including M×N pixels and configured to photoelectrically convert an object image; and
a color filter disposed on an object side of the image sensor, and including a plurality of filter segments,
wherein each filter segment corresponds to one of the pixels of the image sensor, and the plurality of filter segments include first to Z-th filter segments having spectral transmittances different from each other,
wherein a condition below is satisfied:

$$0.4 < \frac{1}{L}\sum_{k=1}^{L} \frac{P_k}{MN} < 0.9$$

$$2^{L-1} \le Z \le 2^L$$

where L is an integer equal to or larger than four, and $P_k$ represents the number of pixels of the image sensor, which receive light of a wavelength band k (k=1, 2, ..., L), and
wherein a condition below is satisfied:

$$0.1 \le \frac{1}{(L-1)L}\left(\sum_{k_1=1}^{L}\sum_{k_2=1}^{L} R_{k_1,k_2} - L\right) \le 0.9$$

$$\text{where } R_{k_1,k_2} = \frac{\sum_{j=1}^{N}\sum_{i=1}^{M} F_{k_1}(i,j)F_{k_2}(i,j)}{\sqrt{\sum_{j=1}^{N}\sum_{i=1}^{M} F_{k_1}(i,j)^2 \times \sum_{j=1}^{N}\sum_{i=1}^{M} F_{k_2}(i,j)^2}}$$

where $F_k(i,j)$ (i=1, 2, ..., M, and j=1, 2, ..., N) represents a distribution of the spectral transmittance corresponding to the wavelength band k, $F_{k_1}$ represents a distribution of the spectral transmittance corresponding to a wavelength band $k_1$ ($k_1$=1, 2, ..., L), $F_{k_2}$ represents a distribution of the spectral transmittance corresponding to a wavelength band $k_2$ ($k_2$=1, 2, ..., L), and $R_{k_1,k_2}$ represents a cross-correlation between the $F_{k_1}$ and the $F_{k_2}$.

2. The image-pickup unit according to claim 1, wherein a condition below is satisfied:

$$0.0 \le \frac{\min(F_k(i,j))}{\max(F_k(i,j))} \le 0.6$$

where $\min(F_k(i,j))$ represents a minimum value of $F_k(i,j)$, and $\max(F_k(i,j))$ represents a maximum value of $F_k(i,j)$.

3. The image-pickup unit according to claim 1, wherein a condition below is satisfied:

$$0.25 \le \frac{P_{max}}{P_{min}} \le 4.0$$

where $P_{min}$ represents the number of pixels having minimum transmittance of $F_k(i,j)$, and $P_{max}$ represents the number of pixels having maximum transmittance of $F_k(i,j)$.

4. The image-pickup unit according to claim 1, wherein the filter segments each include a notch filter.

5. The image-pickup unit according to claim 1, wherein the filter segment is made of an absorption material that absorbs light of a particular wavelength band.

6. The image-pickup unit according to claim 1, wherein the image-pickup unit does not include an optical low-pass filter.

7. The image-pickup unit according to claim 1, wherein the plurality of filter segments include a plurality of sets of first to Z-th filter segments, and the first to Z-th filter segments are arranged differently between the sets.

8. The image-pickup unit according to claim 1, wherein the plurality of filter segments include a filter segment that transmits light of a plurality of wavelength bands.

9. The image-pickup unit according to claim 1, wherein any of the pixels receives light of the wavelength band k and a condition below is satisfied:

$$0.1 \le \frac{1}{(\lambda_k - \lambda_{k-1})}\int_{\lambda_{k-1}}^{\lambda_k} T(\lambda)d\lambda \le 1$$

where $\lambda_{k-1}$ represents the shortest wavelength in the wavelength band k, $\lambda_k$ represents the longest wavelength in the wavelength band k, and T($\lambda$) represents a spectral transmittance of the filter segment corresponding to the wavelength band k.

10. An image-pickup apparatus comprising:
an image-pickup unit, wherein
the image-pickup unit comprises:
an image sensor including M×N pixels and configured to photoelectrically convert an object image; and
a color filter disposed on an object side of the image sensor, and including a plurality of filter segments,
wherein each filter segment corresponds to one of the pixels of the image sensor, and the plurality of filter segments include first to Z-th filter segments having spectral transmittances different from each other,
wherein a condition below is satisfied:

$$0.4 < \frac{1}{L}\sum_{k=1}^{L} \frac{P_k}{MN} < 0.9$$

$$2^{L-1} \le Z \le 2^L$$

where L is an integer equal to or larger than four, and $P_k$ represents the number of pixels of the image sensor, which receive light of a wavelength band k (k=1, 2, ..., L), and
wherein a condition below is satisfied:

$$0.1 \le \frac{1}{(L-1)L}\left(\sum_{k_1=1}^{L}\sum_{k_2=1}^{L} R_{k_1,k_2} - L\right) \le 0.9$$

$$\text{where } R_{k_1,k_2} = \frac{\sum_{j=1}^{N}\sum_{i=1}^{M} F_{k_1}(i,j)F_{k_2}(i,j)}{\sqrt{\sum_{j=1}^{N}\sum_{i=1}^{M} F_{k_1}(i,j)^2 \times \sum_{j=1}^{N}\sum_{i=1}^{M} F_{k_2}(i,j)^2}}$$

where $F_k(i,j)$ ($i=1, 2, \ldots, M$, and $j=1, 2, \ldots, N$) represents a distribution of the spectral transmittance corresponding to the wavelength band k, $F_{k1}$ represents a distribution of the spectral transmittance corresponding to a wavelength band $k_1$ ($k_1=1, 2, \ldots, L$), $F_{k2}$ represents a distribution of the spectral transmittance corresponding to a wavelength band $k_2$ ($k_2=1, 2, \ldots, L$), and $R_{k1,k2}$ represents a cross-correlation between the $F_{k1}$ and the $F_{k2}$.

11. The image-pickup apparatus according to claim 10 further comprising:
- a storage configured to store information of the spectral transmittance of each filter segment of the color filter; and
- an image processor configured to produce a multiband image made of spectral images of four or more different wavelength bands based on a signal obtained from the image-pickup unit and the information stored in the storage.

12. The image-pickup apparatus according to claim 11, wherein the image processor separates each wavelength band obtained from pixels that receive light of a plurality of wavelength bands.

13. The image-pickup apparatus according to claim 11, wherein the image processor performs processing to interpolate lacked image information when separating each wavelength band.

14. An image processing system comprising an image-pickup apparatus including an image-pickup unit, wherein the image-pickup unit comprises:
- an image sensor including M×N pixels and configured to photoelectrically convert an object image; and
- a color filter disposed on an object side of the image sensor, and including a plurality of filter segments,
- wherein each filter segment corresponds to one of the pixels of the image sensor,
- the plurality of filter segments include first to Z-th filter segments having spectral transmittances different from each other,
- wherein a condition below is satisfied:

$$0.4 < \frac{1}{L}\sum_{k=1}^{L} \frac{P_k}{MN} < 0.9$$

$$2^{L-1} \leq Z \leq 2^L$$

where L is an integer equal to or larger than four, and $P_k$ represents the number of pixels of the image sensor, which receive light of a wavelength band k ($k=1, 2, \ldots, L$), and wherein a condition below is satisfied:

$$0.1 \leq \frac{1}{(L-1)L}\left(\sum_{k_1=1}^{L}\sum_{k_2=1}^{L} R_{k_1,k_2} - L\right) \leq 0.9$$

where $R_{k_1,k_2} = \dfrac{\sum_{j=1}^{N}\sum_{i=1}^{M} F_{k1}(i,j)F_{k2}(i,j)}{\sqrt{\sum_{j=1}^{N}\sum_{i=1}^{M} F_{k1}(i,j)^2 \times \sum_{j=1}^{N}\sum_{i=1}^{M} F_{k2}(i,j)^2}}$ where $F_k(i,j)$ ($i=1, 2, \ldots, M$, and $j=1, 2, \ldots, N$) represents a distribution of the spectral transmittance corresponding to the wavelength band k, $F_{k1}$ represents a distribution of the spectral transmittance corresponding to a wavelength band $k_1$ ($k_1=1, 2, \ldots, L$), $F_{k2}$ represents a distribution of the spectral transmittance corresponding to a wavelength band $k_2$ ($k_2=1, 2, \ldots, L$), and $R_{k1},k2$ represents a cross-correlation between the $F_{k1}$ and the $F_{k2}$; and
- an image processing apparatus configured to produce a multiband image made of spectral images of four or more different wavelength bands based on a signal obtained from the image sensor of the image-pickup apparatus and information of the spectral transmittance of each filter segment of the color filter.

* * * * *